United States Patent Office 3,302,542
Patented Feb. 7, 1967

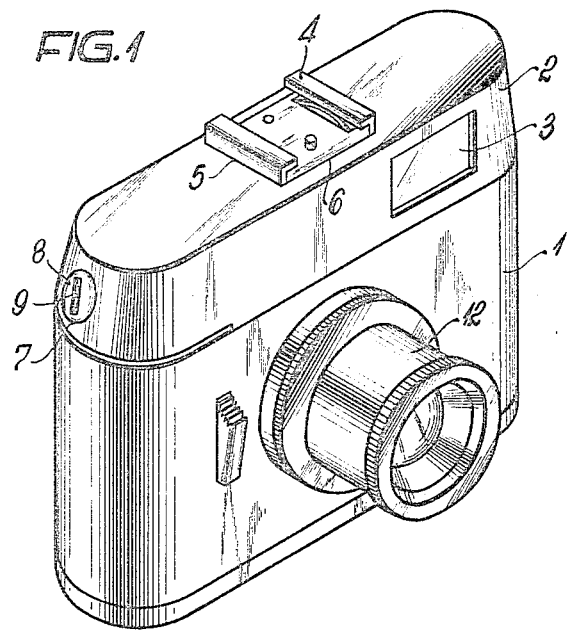
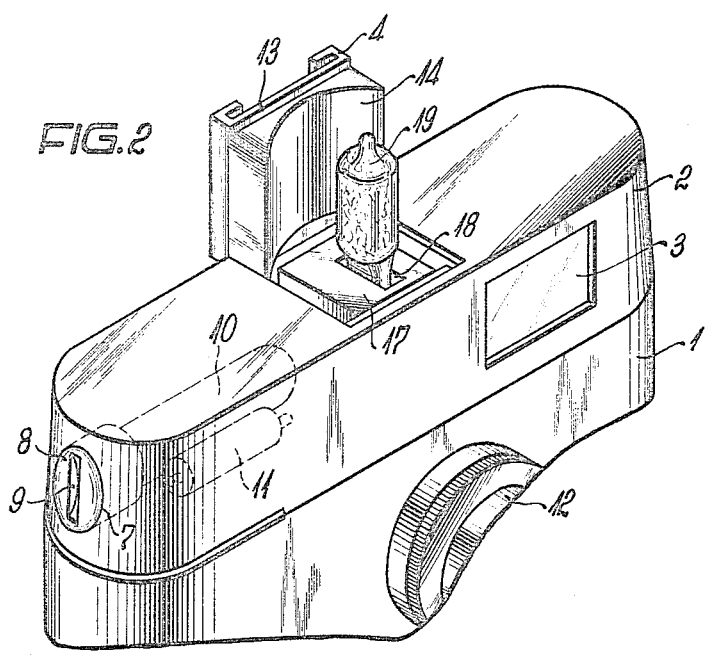

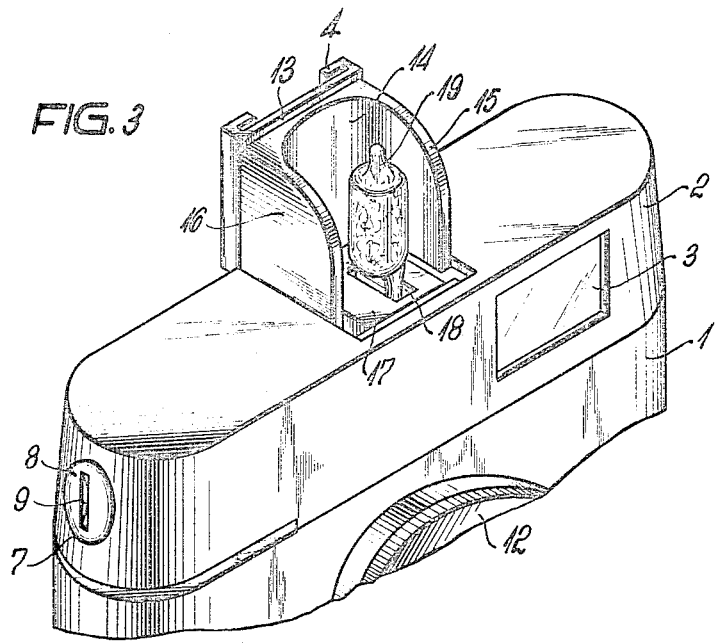
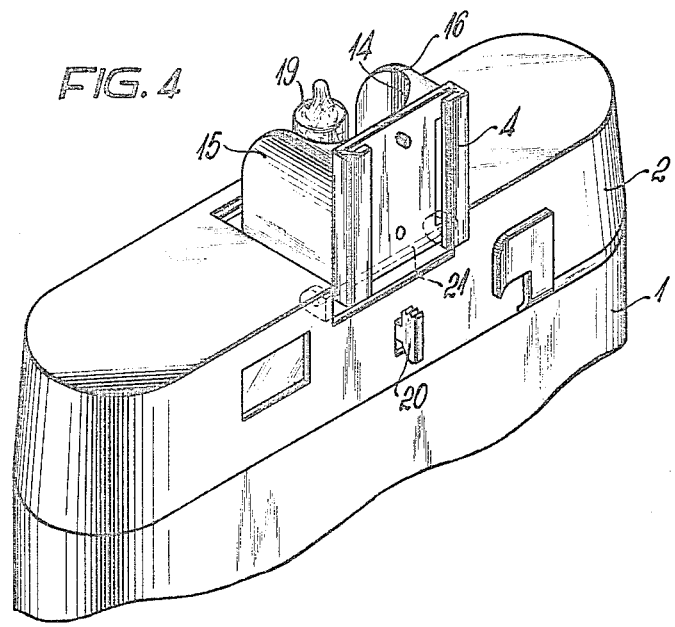

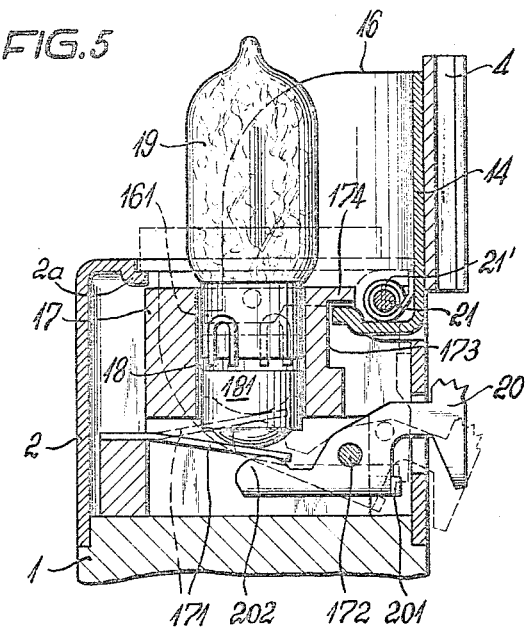
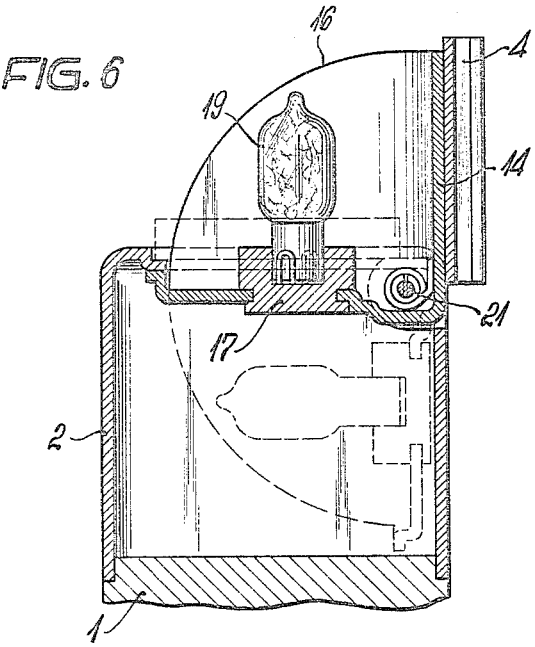

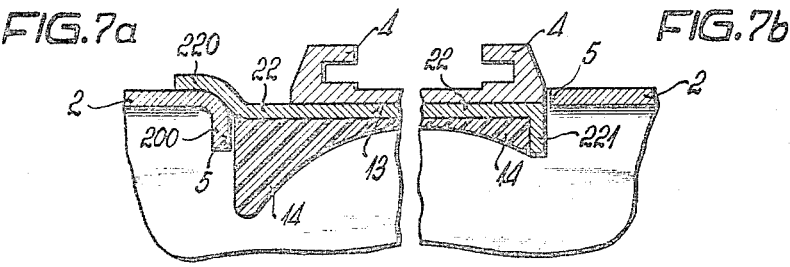
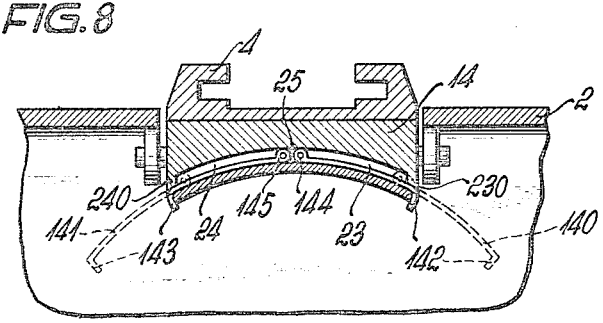
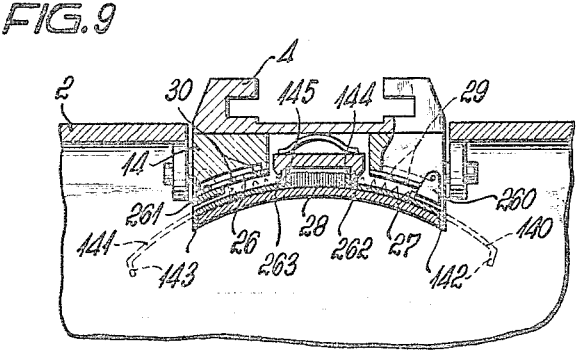

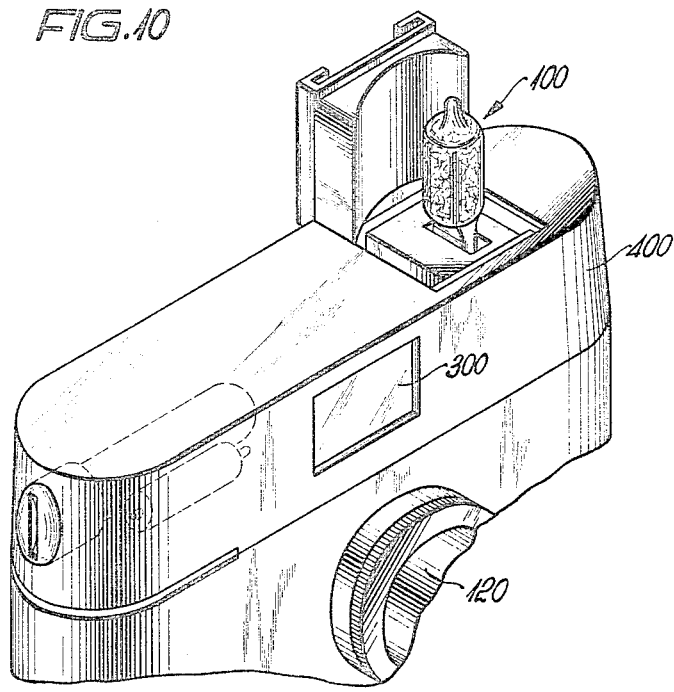

3,302,542
CAMERA WITH BUILT-IN FLASH ASSEMBLY
Paul Greger, Braunschweig, and Herbert Weidner, Volkmarode, Steinkamp, Germany, assignors to Voigtlander A.G., Braunschweig, Germany, a corporation of Germany
Filed May 4, 1964, Ser. No. 364,407
Claims priority, application Germany, May 7, 1963,
V 15,124
24 Claims. (Cl. 95—11)

The present invention relates to cameras.

More particularly, the present invention relates to cameras with built-in flash assemblies.

As is well known, conventional still cameras include a camera housing and a hollow cap mounted on the camera housing to define therewith a space for accommodating components of the camera. Where such a camera has a built-in flash assembly a reflector which is fixed to the cap takes up valuable space when the flash assembly is not in use and projects undesirably from the cap even when the flash assembly is not used. Moreover, such a projecting reflector is easily subject to injury, to gathering of dust, or to being scratched, and it has therefore become conventional to cover such fixed reflectors with the additional disadvantage that it becomes necessary to connect a cover for the reflector to the cap for example by pivoting the reflector cover to the cap so that the cover can be displaced away from the reflector in order to place the latter in a position ready for use. When the cover is removable from the cap to uncover the reflector then of course there is the possibility of loss of the cover or sometimes the operator forgets to remove the cover so that improper flash exposures are made.

There are also known cameras where the reflector of the flash assembly is shiftable relative to the camera housing or to the cap so as to be displaceable into and out of the cap, but in this case the socket for the lamp of the flash assembly is exposed and is therefore subject to injury and to accumulation of dust and the like.

Conventional cameras which have reflectors turnable to and from an operating position projecting from the camera also have the reflector, when it is not in its operative position, projecting undesirably from the cap and also occupying in its position of non-use an undesirably large amount of space. This is true even in the case where such a reflector includes shiftable reflector extensions to increase the reflecting area when the reflector is displaced to its operating position.

It is also known to provide cameras with flash assemblies fixed thereto and situated in a suitable cutout or offset portion of the hollow cap so as to be located in a space which would otherwise be enclosed by the cap, but assemblies of this type require a considerable amount of space particularly since they include the electrical components of the flash assembly.

It is a primary object of the present invention to provide a camera of the above type with a built-in flash assembly which in its rest position of non-use does not provide the camera with any type of projecting portion which differs from a camera which does not have a built-in flash assembly.

In particular, it is an object of the present invention to take advantage of the accessory shoe, which is in any event present on every camera, for the purpose of utilizing the area normally occupied by the accessory shoe to accommodate a structure of the flash assembly.

Thus, it is an object of the present invention to provide for a camera of the above type a construction where when the flash assembly is in its position of non-use it is entirely accommodated in the interior of the cap which is mounted on the camera housing with the shoe located in a normal position at the top wall of the cap.

A further object of the present invention is to provide a construction where the normal accessory shoe can be moved from its normal position to a flash position and when so moved will place the built-in flash assembly in an operative position ready for use. A further object of the present invention is to provide a construction where a reflector flash assembly is connected with the accessory shoe in such a way as to form a unitary structure therewith.

As is well known, an accessory shoe of the above type may carry any one of a number of accessories such as a special viewfinder, a range finder, or a light meter, etc. During normal use of the camera, the shoe with any such accessory carried thereby will remain in a normal position while the operator focuses the camera and makes other adjustments such as adjustments for light values, and the like. Only just before an exposure is to be made will the operator turn or otherwise move the accessory shoe away from its normal position so as to place the flash assembly of the invention in a position for operation, and according to a further object of the present invention the shoe is so situated that even when it is displaced to a position which renders the flash assembly operative any accessory which is carried by the shoe can be moved therewith without encountering any obstructions or can be removed from the shoe before the shoe itself is displaced for rendering the flash assembly operative.

Yet another object of the present invention is to provide for a structure of the above type a means which will conveniently mount an accessory shoe in a manner enabling it to be easily turned relative to the cap of the camera for setting the flash assembly in a position ready for use.

Furthermore, while the area occupied by the reflector of the flash assembly can be the same as that occupied by the accessory shoe, it is a further object of the present invention to provide a construction where the reflector can extend over an area greater than that occupied by the accessory shoe.

The accessory shoe will in accordance with the invention be aligned with an opening in a top wall of the cap of the camera, and a further object of the present invention includes a construction which will prevent any foreign matter from entering into the interior of the cap through this opening in its top wall.

In addition it is an object of the invention to construct the top wall of the cap of the camera in such a way that this top wall will guide at least part of the flash assembly for movement between operative and inoperative positions.

Also, the objects of the present invention include the provision of a structure where the reflector of the flash assembly can have extensions which may be displaced to positions increasing the reflecting area of the reflector.

The objects of the present invention also include an arrangement for accommodating a socket for a flash lamp in a very convenient, space-saving manner.

Furthermore, it is an object of the invention to provide a construction where the flash assembly will be reliably maintained in its inoperative position where the accessory shoe is located at the top wall of the cap of the camera, while at the same time the structure can very quickly and conveniently be displaced to a position where the flash assembly is ready for operation.

The objects of the present invention also include an arrangement according to which free spaces of the camera which in any event are available are used for the purpose of accommodating components of the flash assembly.

Thus, it is among the objects of the invention to provide a construction which makes it easy and convenient to have access to a source of current such as a battery of the flash assembly for easily replacing the latter whenever required.

According to a primary feature of the invention the camera with the built-in flash assembly includes a hollow cap mounted on the camera housing and defining therewith, as is well known, a space for accommodating components of the camera, and this cap has a top wall formed with an opening. An accessory shoe is located at the top wall of the cap in alignment with the opening thereof when the accessory shoe is in a normal position, and a means connects the accessory shoe to the cap for turning movement relative thereto from the normal position of the acccessory shoe to a flash position where the accessory shoe projects from the cap. This accessory shoe has an outer face directed toward the interior of the cap when the accessory shoe is in its normal position and directed forwardly when the accessory shoe is in its flash position, and in accordance with the invention a reflector means of the flash assembly is connected to the accessory shoe at the outer face thereof and is displaced to an operating position, adapted to cooperate with a lamp of the flash assembly for reflecting the light of the lamp, when the shoe is displaced from its normal to its flash position.

The invention is illustrated by way of example in the accompanying drawing which forms part of the application and in which:

FIG. 1 is a perspective illustration of a camera provided with a built-in flash assembly in accordance with the invention;

FIG. 2 shows the upper part of the camera of FIG. 1 at an enlarged scale, as compared to FIG. 1, with the flash assembly placed in its operative position;

FIG. 3 is a view similar to FIG. 2 but showing a different embodiment of a reflector of the flash assembly;

FIG. 4 shows the structure of FIG. 3 as it appears from the rear of the camera;

FIG. 5 is a transverse section illustrating the details of the structure;

FIG. 6 is a transverse section illustrating a different embodiment according to which a lamp socket and lamp are turnable with the entire flash assembly which is connected to the accessory shoe;

FIG. 7a shows another embodiment of a reflector and accessory shoe assembly;

FIG. 7b shows a further embodiment of a reflector and accessory shoe assembly;

FIG. 8 shows yet another embodiment of a reflector means which can be used with the structure of the invention; and FIG. 9 shows a still further embodiment of a reflector structure capable of being used with the flash assembly of the invention;

FIG. 10 is a view similar to FIG. 2 but showing an off-center position of the flash assembly.

Referring now to FIG. 1, there is shown therein a camera which includes a camera housing 1 and a cap 2 which, as is well known, is hollow and is mounted on the housing 1 so as to define therewith a space accommodating various components of the camera, such as the viewfinder which includes the window 3 which is visible in FIG. 1. The cap 2 has a top wall which, as is known, is provided with an accessory shoe 4 for carrying various accessories which may be mounted on the shoe 4. The accessory shoe 4 may be positioned so as to be flush with the top wall of the cap 2 or it may have a slightly lower elevation than the top wall of the cap 2 so as to appear to be situated in a shallow recess thereof. In the illustrated example, the top wall of the cap 2 is formed with an opening of which only the edges 5 and 6 are visible in FIG. 1, and the lower wall of the shoe 4 is situated in this opening. The opening in the top wall of the cap 2 is square or rectangular and conforms to the configuration of the outline of the accessory shoe 4.

In accordance with the invention, the accessory shoe 4 is connected to the cap 2 for turning movement relative thereto between the normal position shown in FIG. 1 and a flash position as shown in FIG. 2 where the shoe 4 projects upwardly from the cap 2 and is situated at the rear thereof. The means which connects the accessory shoe 4 to the cap 2 for turning movement relative thereto between the normal and flash positions respectively illustrated in FIGS. 1 and 2 is not visible in FIGS. 1 or 2 and includes, for example, an elongated hinge pin or rod carried, for example, by the rear wall of the cap 2 and supporting the shoe for turning movement approximately to an angle of 90 degrees between the positions illustrated in FIGS. 1 and 2. The accessory shoe 4 has an outerface 13 (FIG. 2) which is not visible in FIG. 1 and in the normal position of the shoe 4 which is shown in FIG. 1 is directed toward the interior of the cap 2, while in its flash position the outer face 13 of the shoe 4 is directed forwardly, as is apparent from FIG. 2. When the shoe 4 is in its normal position shown in FIG. 1, a suitable releasable detent structure or the like releasably holds the shoe 4 in its normal position so that it will not undesirably be displaced to the flash position of FIG. 2. It is therefore apparent that when the accessory shoe 4 is in its normal position shown in FIG. 1 the camera does not have any exterior features which would lead one to think that it had a built-in flash assembly.

In the normal position of the accessory shoe 4 it is capable of connecting any desired accessories to the camera in a manner well-known in the art.

The interior space of the cap 2 is used for accommodating the source of current for the flash assembly, and FIG. 2 illustrates how this source of current, in the form of a battery 10, can be situated in a suitable chamber in the interior of the cap 2. Also, in this example a capacitor 11 of the flash assembly is shown as being accommodated in the space provided by the interior of the cap 2. Inasmuch as it will be necessary to replace the battery 10 from time to time, the left end wall of the cap 2, as viewed in FIG. 2, is formed with an opening through which access may be had to a battery 10 for removing it from the interior of the cap 2 and replacing it with another source of current, and a closure means 8 is provided for closing the opening 7. This closure means 8 may be in the form of a simple plug which is threaded into the end wall of the cap 2 and which is provided with an elongated recess 9 for receiving a coin which enables the operator to remove the plug 8 whenever desired. However, instead of being threaded onto the cap, the closure means 8 can have a bayonet connection with the cap, or in fact any suitable shiftable cover member may be used to close the opening 7, or if desired a removable cover can be clamped in its covering position.

Furthermore, instead of accommodating an element such as the battery 10 in the space within the cap 2 as indicated in FIG. 2, it is possible to accommodate this battery at any other part of the interior of the cap 2, such as its upper, forward, or rearward region, or elements such as the battery 10 can be accommodated in the interior of the camera housing between a film spool and the objective 12 which is visible in FIG. 1 or even in the interior of the film spool.

FIGS. 2, 3 and 4 illustrate the accessory shoe 4 in its flash position where it projects from the cap 2. The outer face 13 of the accessory shoe 4 is at this time directed forwardly, while in the position of FIG. 1 this face 13 is directed toward the interior of the cap 2, as was pointed out above. A reflector means 14 is connected to the accessory shoe 4 at its outer face 13 for turning movement with the accessory shoe 4 and when the accessory shoe 4 is in its flash position shown in FIGS. 2–4, the reflector means 14 is in an operative position adapted to cooperate with a flash lamp such as the lamp 19 for reflecting the light thereof. The reflector 14 can be fixed to the accessory shoe 4 in any suitable way such as, for example, by gluing, riveting, screw members, or the like. Furthermore, the accessory shoe and the reflector can be formed in one piece by die casting, by being molded of suitable plastic, and the like.

In the example illustrated in FIG. 2, the reflector 14 has a relatively flat reflecting face. The degree of curvature of the reflecting face can vary and is determined by the designer of the particular camera.

It will be noted that the reflector means 14 of FIGS. 3 and 4 differs from that of FIG. 2, not only with respect to the degree of curvature of the forwardly directed reflecting face, but also because the reflector means 14 of FIGS. 3 and 4 includes a pair of parallel side walls 15 and 16 which extend perpendicularly from the outer face 13 of the shoe 4 through a considerable distance from the latter. These side walls 15 and 16 not only act as portions of the light reflecting structure but also they act as a protection against flying glass in the case of bursting of the flash lamp. The reflecting means 14 of FIGS. 3 and 4 can form a single unit which includes the walls 15 and 16 and which is fixed in any suitable way to the outer surface 13 of the accessory shoe 4, or all of these parts may be formed as a one-piece member.

As is apparent from FIGS. 2 and 3, there is situated in the region of the reflector means 14 a support 17 which carries a socket 18 for the source of illumination, in the illustrated example a flash lamp 19. This support 17 in the illustrated example can be fixed either with the cap 2 or with the camera housing 1.

As may be seen from FIG. 5, the support 17 is in the form of a block which is fixed directly to the top surface of the camera housing 1 and is situated in the interior of the cap 2. The support 17 is formed with a suitable opening for receiving the base of the lamp 19 which, when it is mounted in the socket 18 formed by this opening of the support 17, engages unillustrated leaf springs which releasably hold the lamp 19 in the position illustrated in FIG. 5 and which form part of the electrical circuit for the lamp 19. Beneath the lamp 19 a block 181 is slideable in the bore of the support 17, and this block 181 has a convexly curved bottom end engaging a leaf spring 171 which is fixed at its left end, as viewed in FIG. 5, to part of the support 17 and which extends freely into an elongated cutout which is formed in the lower portion of the support 17, as is apparent from FIG. 5.

A pivot pin 172 extends across this cutout and is supported at its ends by the support 17, and this pin 172 serves to support for pivotal movement a manually engageable lever 20 which extends through a suitable slot in the rear wall of the cap 2 to the exterior of the cap 2 so as to be accessible to the operator. The leaf spring 171 engages the convexly curved upper edge of the front portion 202 of the lever 20 and this leaf spring 171 normally assumes the solid line position illustrated in FIG. 5 to urge the lever 20 in a counterclockwise direction, as viewed in FIG. 5, about the pin 172 to a position where the lever 20 engages the top end of the slot in the rear wall of the cap 2.

The rear wall of the cap 2 is also formed with a notch for receiving part of the reflector means 14, and part of the rear wall forms a pair of forwardly directed tongues carrying a pivot pin 21 which extends through the reflector means 14 to support the latter and the accessory shoe 4 for turning movement between the position shown in FIG. 5 and inoperative position of the reflector means 14, shown in dotted lines in FIG. 5, where the shoe 4 is in its normal position with a front edge portion of the shoe which extends beyond the reflector means engaging an inwardly directed lip 2a of the cap 2, as indicated in FIG. 5.

A coil spring 21' is coiled about the hinge pin 21, has one end connected to the hinge pin which is fixed, and with its other free end engages a part of the reflector 14 for urging the latter together with the accessory shoe 4 to the solid line position illustrated in FIG. 5.

The rear of the support 17 is formed with a notch 173 providing the support 17 with a rearwardly directed flange 174 which engages part of the reflector 14 for limiting the turning movement of the latter and the shoe 4 by the spring 21' to the position indicated in FIG. 5 so that in this way turning of the shoe 4 is limited to approximately 90 degrees.

The side wall 16 of the reflector has at its lower left corner, as viewed in FIG. 5, a projection 161, and the lever 20 has a laterally extending projection 201 which engages the projection 161 when the shoe 4 is returned to its normal position. During the return of shoe 4 to its normal position this projection 161 will ride over the projection 201 which will then snap in front of the projection 161 for releasably holding the shoe 4 in its normal position with the reflector means 14 situated in the interior of the cap and with the upper portion of the support 17 situated between the side walls of the reflector. The other side wall 15 may have a projection similar to the projection 161 cooperating in the same way with another lateral extension of the lever 20 similar to the extension 201 and extending in the opposite direction. Thus, in order to use the flash assembly the operator need only depress the lever 20 slightly at its portion which is accessible at the rear of the cap for the purpose of displacing the projection 201 downwardly beyond the projection 161 and the spring 21' will snap the parts to the position shown in FIG. 5, the movement being limited by engagement of the reflector with the flange 174 at the underside thereof, as pointed out above.

When a lamp 19 is introduced into the socket 18 the block 181 will be lowered to the solid line position shown in FIG. 5 and will engage the leaf spring 171. The lever 20 also forms an ejector means since in order to eject a lamp 19 after it has been ignited it is only necessary to depress the lever 20 to the dotted line position shown in FIG. 5, thus raising the spring 171 and the block 181 therewith to eject a lamp 19 from the socket 18. Upon release of the lever 20 it will be returned by the spring 171 to the solid line position shown in FIG. 5.

A pair of contacts are in the unillustrated electrical circuit of the flash assembly and may be moved into engagement with each other by movement of the shoe 4 to the flash position shown in FIG. 5, so that in this way the circuit will be reliably maintained opened when the shoe 4 is in its normal position and will at the same time be ready for operation when the shoe 4 is displaced to its flash position. As soon as the shoe 4 is turned by the operator back to its normal position, the projections 161 and 201 cooperate to releasably hold the structure in the inoperative position.

The embodiment of the invention which is illustrated in FIG. 6 has the support 17 carried directly by a wall which extends across the bottom of the reflector means 14, as is apparent from FIG. 6. Thus, in this case the support 17 and the socket 18 are fixed to the reflector means 14 and of course to the accessory shoe 4 for turning movement therewith, and because of the different size of the socket it is capable of carrying a smaller lamp 19 which can be accommodated entirely within the interior of the reflector means so as to be turnable therewith to the inoperative position when the shoe 4 is displaced back to its normal position.

With this construction the pin 21 can also support the structure for turning movement in the manner described above and in the same way a spring is provided for urging the parts to the solid position illustrated in FIG. 6. When the parts are turned to the dotted line position illustrated in FIG. 6 any suitable releasable holding means will retain the parts in the position where the accessory shoe 4 is situated at the top wall of the cap 2.

Thus, with the embodiment of FIG. 6 it is possible for the lamp itself to be turned with the entire assembly.

Also, in the case of FIG. 6 when the parts are turned to the solid line position unillustrated contacts place the circuit in readiness for operation, interconnecting the source of current with the charging circuit, and of course this connection is correspondingly interrupted when the shoe 4 is returned to its normal position.

FIGS. 7a and 7b respectively illustrate different embodiments which except for the details shown in FIGS. 7a and 7b and described below may be identical with any of the embodiments described above. In both of these embodiments the reflector means 14 includes a plate 22 of sheet metal, for example, situated between the reflector itself and the outer face 13 of the shoe 4 and fixed to this outer face as well as to the reflector so that the parts are interconnected with the interposition of this plate 22. The features shown in FIGS. 7a and 7b and described below can be used interchangeably or in any desired combination not only with respect to each other but also with respect to the other embodiments of the invention.

In FIG. 7a, the opening 5 in the top wall of the cap 2 is larger than the area of the outer face 13 of the accessory shoe 4. The top wall of the cap 2 is formed along the edge of the opening 5 with an inwardly directed flange 200. In this case, the reflector 14 has a size which corresponds to the size of the opening 5 so that the reflector 14 is considerably greater than the outer face 13 of the accessory shoe 4, and it has a relatively sharp curvature as indicated in FIG. 7a. Moreover, when the shoe 4 is in its normal position as shown in FIG. 7a the reflector 14 is located at the elevation of the top wall of the cap 2. In the illustrated example, the outer face 13 of the shoe 4 is somewhat lower than the top surface of the upper wall of the cap 2, when the shoe 4 is in its normal position illustrated in FIG. 7a, and in this case the outer periphery 220 of the plate 22 is curved as illustrated so as to engage the exterior surface of the top wall of the cap 2 and thus seal the interior of the cap 2 when the shoe 4 is in its normal position. It will be noted that in this case the flange 200 cooperates with the exterior side surface of the reflector 14 for guiding the assembly for movement between its two positions.

In the embodiment which is illustrated in FIG. 7b, the intermediate plate 22 does not extend beyond the surface 13 of the shoe 4, and in this case of course the opening 5 has a size which corresponds to the area of the outer face 13 of the shoe 4. In the embodiment of FIG. 7b, the plate 22 has an inwardly directed flange 221 surrounding the reflector 14, although if desired, the wall 22 could simply have an edge which is aligned with the periphery of the outer face 13 of the shoe 4. The top wall of the cap 2 of this embodiment is simply formed with a cutout so as to have the opening 5 which is not formed by any inwardly directed flange as was the case with the embodiment of FIG. 7, although if desired, such a flange could be included. The reflector 14 of FIG. 7b is of course flatter and smaller than that of FIG. 7a.

In the embodiments of FIGS. 8 and 9, except for the details of the reflector means, the structure can be the same as any of the above-described embodiments.

Referring to FIG. 8, it will be seen that the reflector means 14 of this embodiment includes a pair of reflector extensions 140 and 141 which are laterally shiftable to the dotted line positions with respect to the remainder of the reflector, as illustrated in FIG. 8, so as to increase the reflecting area. The reflector has a central reflecting portion the same as the reflecting portion of the reflector of FIG. 2, for example, and in their inoperative positions the reflector extensions 140 and 141 overlap the central reflector portion. Of course, the extensions 140 and 141 are not displaced to the dotted line positions indicated in FIG. 8 until the accessory shoe 4 is turned to its flash position so that the reflector 14 is in its operating position before the extensions 140 and 141 are moved out.

Because these extensions 140 and 141 increase the reflecting area of the reflector means they can replace the side walls 15 and 16 of FIGS. 3 and 4. The reflector means includes guides which guide the extensions 140 and 141 for movement between their overlapping, non-reflecting positions and their operative positions shown in dotted lines in FIG. 8, and the guides take the form of narrow passages 23 and 24 formed in the body of the reflector and in which the extensions can move. At their outer side edges the extensions 140 and 141 respectively have lips 142 and 143 accessible at the exterior of the reflector means so as to be easily engaged by the operator when it is desired to shift the extensions to the dotted line positions indicated in FIG. 8. The outward movement of the reflector extensions is limited by inner lip portions 144 and 145 which have a thickness corresponding to the width of the passages 23 and 24 and which respectively engage stop edges 230 and 240 in order to limit the outward movement of the extensions.

If desired, any suitable releasable detent structure may be provided for releasably holding the extensions in their extended positions shown in dotted lines. Before the parts are turned to the position shown in FIG. 8, the operator will manually press the lips 142 and 143 toward each other so as to return the reflector extensions to their inoperative positions overlapping the central portion of the reflector situated in the guide passages 23 and 24, and in this position the inner edge portions 144 and 145 of the reflector extensions engage a central rib 25 separating the passages 23 and 24 from each other, and in their inner positions the reflector extensions also can engage any suitable releasable detent structure which will releasably hold the parts in the solid line position indicated in FIG. 8. The particular configuration of the reflector extensions 140 and 141 can be adapted to carry out different purposes. For example, it is possible to construct these extensions in such a way that they can be used to adapt the reflector means for use with objectives of different focal lengths with a camera of the type which has interchangeable objectives of different focal lengths.

In the embodiment of FIG. 9, the extensions 140 and 141 are shiftable in passages 27 and 26, respectively, which are thicker than the passages 23 and 24 of FIG. 8, and in the embodiment of FIG. 9 there is a spring 28 situated between the reflector extensions and engaging their inner edges 144 and 145 so as to constantly urge the reflector extensions outwardly to the dotted line position indicated in FIG. 9. In their inner inoperative positions the reflector extensions 140 and 141 of FIG. 9 engage with their inner edge portions 144 and 145 the forwardly directed flanges 262 and 263 of an elongated detent element movable in a suitable space in the body of the reflector and urged forwardly by a leaf spring as illustrated in FIG. 9. With this construction, when the sections 140 and 141 are pressed inwardly their inner edges 144 and 145 will simply snap behind the flanges 262 and 263. An unillustrated and known structure will retract the detent element so as to move the edges of flanges 262 and 263 rearwardly for releasing the reflector extension to be displaced outwardly by the spring 28. This construction can operate in response to the movement the accessory shoe 4 to its flash position. Thus, at the proper moment in the outward swinging of the shoe 4 a suitable structure can act on the detent element to retract its flanges 262 and 263 so as to release the reflector extensions for outward movement by the spring 28. The reflector means of this embodiment includes a pair of lateral stop members 260 and 261 which limit the outward movement of the extensions.

To return the reflector extensions to their inoperative positions behind the central reflector portion, the operator need only manually press the reflector sections inwardly until they snap behind flanges 262 and 263. Then the parts can be returned to the position shown in FIG. 9. If the reflector extensions 140 and 141 are to be adapted to different angles of field of various interchangeable lenses, the extensions will be pushed back into the range of the reflector 14 until they snap behind catches 29, 30. Naturally, there can be arranged more than two catches.

The embodiment of the invention which is illustrated in FIG. 10 comprises the very means as shown in FIG. 2 but it has the flash assembly, which here is designated with 100, arranged not above the axis of the objective 120 but in an off-center position of the camera, thus being situated in the region of an end of the cap 400. The view finder is arranged in this case in the central portion of the cap 400, above the axis of the objective 120, and is designated with 300.

In all of the above-described embodiments, the flash illumination is derived from a conventional flash lamp such as the lamp 19. However, with a suitable size of the assembly it is also possible in accordance with the invention to use an electronic flash apparatus.

While specific embodiments of the invention have been shown and described in detail to illustrate the application of the principles of the invention, it will be understood that the invention may be embodied otherwise without departing from such principles.

What is claimed is:

1. In a camera with built-in flash assembly, a camera housing, a hollow cap mounted on said camera housing and defining therewith a space for accommodating components of the camera, said cap having a top wall formed with an opening, an accessory shoe having a normal position substantially flush with said top wall of said cap in alignment with said opening thereof, said shoe having an outer face directed toward the interior of said cap in said normal position of said shoe, means connecting said shoe to said cap for turning movement relative thereto from said normal position to a flash position where said shoe projects from said cap and has its outer face directed forwardly, and reflector means connected to said shoe for turning movement therewith and having in said flash position of said shoe an operating position adapted to cooperate with a lamp of the flash assembly for reflecting the light thereof, the space defined between said cap and housing accommodating said reflector means when said shoe is in its normal position.

2. In a camera as recited in claim 1, said reflector means including a reflector member fixed directly to said outer face of said shoe.

3. In a camera as recited in claim 1, said reflector means being integral with said shoe at said outer face thereof.

4. In a camera as recited in claim 1, said reflector means including a reflector member and a plate situated between and fixed to said reflector member and said outer face of said shoe.

5. In a camera as recited in claim 4, said plate having an area larger than the area of said outer face of said shoe.

6. In a camera with a built-in flash assembly, a camera housing, a hollow cap mounted on said camera housing and defining therewith a space for accommodating components of the camera, said cap having a top wall formed with an opening, an accessory shoe having a normal position substantially flush with said top wall of said cap in alignment with said opening thereof, said shoe having an outer face directed toward the interior of said cap in said normal position of said shoe, means connecting said shoe to said cap for turning movement relative thereto from said normal position to a flash position where said shoe projects from said cap and has its outer face directed forwardly, and reflector means connected to said shoe for turning movement therewith and having in said flash position of said shoe an operating position adapted to cooperate with a lamp of the flash assembly for reflecting the light thereof, said reflector means including a reflector member and a plate situated between and fixed to said reflector member and said outer face of said shoe and said plate having an area larger than the area of said outer face of said shoe, said plate having beyond said shoe a peripheral edge portion engaging said top wall of said cap at the exterior of said top wall when said shoe is in said normal position thereof.

7. In a camera with a built-in flash assembly, a camera housing, a hollow cap mounted on said camera housing and defining therewith a space for accommodating components of the camera, said cap having a top wall formed with an opening, an accessory shoe having a normal position substantially flush with said top wall of said cap in alignment with said opening thereof, said shoe having an outer face directed toward the interior of said cap in said normal position of said shoe, means connecting said shoe to said cap for turning movement relative thereto from said normal position to a flash position where said shoe projects from said cap and has its outer face directed forwardly, and reflector means connected to said shoe for turning movement therewith and having in said flash position of said shoe an operating position adapted to cooperate with a lamp of the flash assembly for reflecting the light thereof, said reflector means including a reflector member and a plate situated between and fixed to said reflector member and said outer face of said shoe and said plate having an area larger than the area of said outer face of said shoe, said plate having beyond said outer face of said shoe a peripheral edge portion projecting away from said shoe into the interior of said cap when said shoe is in its normal position and located directly next to an edge of said top wall of said cap which defines said opening thereof.

8. In a camera having a built-in flash assembly, a camera housing, a hollow cap mounted on said housing and defining therewith a space for accommodating components of the camera, said cap having a top wall formed with an opening and said top wall having an inwardly directed flange extending from said top wall toward the interior of said cap along the edge of said opening thereof, an accessory shoe normally having a position located at said top wall of said cap in alignment with said opening thereof, said shoe having an outer face directed toward the interior of said cap in a normal position of said shoe, means connecting said shoe to said cap for turning movement relative thereto between said normal position and a flash position projecting from said cap and having said outer face directed forwardly, and reflector means fixed to said outer face of said shoe for turning movement with the latter, said reflector means having an operative position, when said shoe is in said flash position thereof, where said reflector means is adapted to cooperate with a lamp of the flash assembly for reflecting the light of the lamp, said flange of said top wall guiding said shoe and reflector means during turning movement thereof relative to said cap.

9. In a camera having a built-in flash assembly, a camera housing, a hollow cap mounted on said housing and defining therewith a space for accommodating components of the camera, said cap having a top wall formed with an opening, an accessory shoe located at said top wall of said cap in alignment with said opening thereof when said shoe is in a normal position, said shoe having an outer face directed toward the interior of said cap when said shoe is in said normal position thereof, means connecting said shoe to said cap for turning movement relative thereto from said normal position to a flash position where said shoe projects from said cap and has said outer face directed forwardly, and reflector means connected to said outer face of said shoe for turning movement with the latter having, when said shoe is in said flash position, an operating position where said reflector means is adapted to cooperate with a lamp for reflecting the light thereof, said reflector means including a pair of side walls which project forwardly from said outer face of said shoe when the latter is in said flash position thereof and said side walls serving not only to participate in the reflection of light but also to act as a protection when a lamp bursts.

10. In a camera having a built-in flash assembly, a camera housing, a hollow cap mounted on said housing and defining therewith a space for accommodating components of the camera, said cap having a top wall formed with an opening, an accessory shoe substantially flush with said top wall of said cap in alignment with said opening thereof in a normal position of said shoe, said shoe having an outer face of a smaller size than said opening directed toward the interior of said cap when said shoe is in said normal position thereof, means connecting said shoe to said cap for turning movement relative thereto from said normal position of said shoe to a flash position where said shoe projects from said cap and has said outer face thereof directed forwardly, and reflector means connected to said shoe at said outer face thereof and having, when said shoe is in said flash position, an operating position where said reflector means is adapted to cooperate with a lamp for reflecting the light thereof, the space defined between said cap and housing accommodating said reflector means when said shoe is in its normal position.

11. In a camera as recited in claim 10, said reflector means having a size greater than the area of said outer face of said shoe and projecting laterally beyond said outer face of said shoe.

12. In a camera having a built-in flash assembly, a camera housing, a hollow cap mounted on said housing and defining therewith a space for accommodating components of the camera, said cap having a top wall formed with an opening, an accessory shoe having a normal position located at said top wall of said cap in alignment with said opening thereof, said shoe having an outer face which is directed toward the interior of said cap in the normal position of said shoe, means connecting said shoe to said cap for turning movement relative thereto from said normal position to a flash position where said shoe projects from said cap and has said outer face directed forwardly, and reflector means connected to said outer face of said shoe for turning movement therewith, said reflector means having, when said shoe is in its flash position, an operating position where said reflector means is adapted to cooperate with a lamp for reflecting the light thereof, said reflector means including a central portion fixed with respect to said shoe and a pair of lateral extensions having inoperative positions overlapping said central portion and operative positions projecting laterally therefrom to increase the reflecting area of said reflector means, said reflector means including guides which guide said lateral extensions for movement relative to said central portion of said reflector means between said operative and inoperative positions of said lateral extensions.

13. In a camera as recited in claim 12, said reflector means including at least one spring situated between said lateral extensions and urging them to their operative positions.

14. In a camera as recited in claim 12, said extensions being located directly next to each other in their inoperative positions and having outer manually-engageable edge portions accessible at the exterior of said reflector means when the latter is in its operating position so that the operator can engage said extensions and displace them to their operative positions.

15. In a camera with a built-in flash assembly, a camera housing member, a cap member mounted on said camera housing member and defining therewith a space for accommodating components of the camera, said cap member having a top wall formed with an opening, an accessory shoe substantially flush with said top wall of said cap member in alignment with said opening thereof, in a normal position of said shoe, said shoe having in its normal position an outer face which is directed toward the interior of said cap member, means connecting said shoe to said cap member for turning movement relative thereto between said normal position and a flash position where said shoe projects from said cap member and has said outer face directed forwardly, reflector means connected to said outer face of said shoe for turning movement with said shoe and said reflector means having, when said shoe is in its flash position, an operating position where said reflector means is adapted to cooperate with a lamp to reflect the light thereof, and a lamp socket accessible at said opening of said top wall of said cap member when said shoe is in its flash position for supporting a lamp in an operative position relative to said reflector means, the space defined between said cap and housing accommodating said reflector means when said shoe is in its normal position.

16. In a camera as recited in claim 15, said socket being fixed to one of said members.

17. In a camera as recited in claim 15, said socket being fixed to said reflector means for turning movement with the latter and with said shoe when said shoe is displaced between its normal and flash positions, said socket being situated in the interior of said cap member when said shoe is in its normal position and being adapted to support a lamp for turning movement also with said shoe so that when said shoe is in its normal position a lamp operatively connected to said socket will also be situated in the interior of said cap member.

18. In a camera having a built-in flash assembly, a camera housing, a hollow cap mounted on said housing and defining therewith a space for accommodating components of the camera, said cap having a top wall formed with an opening, an accessory shoe having a normal position substantially flush with said top wall of said cap in alignment with said opening and said shoe having an outer face which is directed toward the interior of said cap in the normal position of said shoe, means pivotally connecting said shoe to said cap for turning movement relative thereto from said normal position to a flash position where said shoe projects from said cap and has said outer face directed forwardly, reflector means connected to said shoe at said outer face thereof for turning movement therewith and having, when said shoe is in its flash position, an operating position adapted to cooperate with a lamp for reflecting the light thereof, spring means engaging said shoe for urging the latter from said normal to said flash position, and manually operable releasable holding means releasably holding said shoe in opposition to said spring means in said normal position until said manually operable releasable holding means is manipulated by the operator to release said shoe for turning movement by said spring means from said normal to said flash position, the space defined between said cap and housing accommodating said reflector means when said shoe is in its normal position.

19. In a camera as recited in claim 18, said manually operable releasable holding means extending from the interior of said cap to the exterior thereof and directly engaging said reflector means for releasably holding said shoe in its normal position.

20. In a camera having a built-in flash assembly, a camera housing, a hollow cap mounted on said mounting and defining therewith a space for accommodating components of the camera, said cap having a top wall formed with an opening, an accessory shoe substantially flush with said top wall of said cap in alignment with said opening thereof when said shoe is in a normal position, said shoe having in its normal position an outer face directed toward the interior of said cap, means connecting said shoe to said cap for turning movement relative thereto from said normal position to a flash position where said shoe projects from said cap and has said outer face directed forwardly, reflector means connected to said shoe at said outer face thereof for turning movement therewith and having, when said shoe is in its flash position, an operating position adapted to cooperate with a lamp for reflecting the light thereof, a lamp socket accessible at said opening when said shoe is in its flash position and adapted to carry a lamp in an operative position relative to said reflector means, and ejector means located adjacent said socket for ejecting a lamp therefrom, the space defined between said cap and housing accommodating said reflector means when said shoe is in its normal position.

21. In a camera as recited in claim 1, said shoe being situated substantially centrally of said cap.

22. In a camera as recited in claim 1, said shoe being situated in the region of an end of said cap out of alignment with a central portion of said cap.

23. In a camera having a built-in flash assembly, a camera housing, a hollow cap mounted on said housing and defining therewith a space for accommodating components of the camera, said space also accommodating at least a source of current for the flash assembly, said cap having a top wall formed with an opening, an accessory shoe having a normal position located at said top wall in alignment with said opening and having an outer face which in the normal position of said shoe is directed toward the interior of said cap, means connecting said shoe to said cap for turning movement relative thereto from said normal position to a flash position projecting from said cap and having said outer face directed forwardly, and reflector means connected to said shoe at said outer face thereof and having, when said shoe is in its flash position, an operating position adapted to cooperate with a lamp for reflecting the light thereof, the space defined between said cap and housing also accommodating said reflector means when said shoe is in its normal position.

24. In a camera as recited in claim 23, said cap being formed at one of its end walls with a second opening through which access may be had to the interior of said cap for removing said source of current from said space and replacing it with a new source of current, and closure means carried by said cap in a position closing said second opening thereof, said closure means being removable from said cap to uncover said second opening.

References Cited by the Examiner
UNITED STATES PATENTS

| | | | |
|---|---|---|---|
| 2,871,775 | 2/1959 | Van der Mei | 95—11.5 |
| 3,143,942 | 8/1961 | Hennig | 95—11.5 |
| 3,184,584 | 5/1965 | Bundschuh | 240—1.3 |

JOHN M. HORAN, *Primary Examiner.*